(12) United States Patent
Wu et al.

(10) Patent No.: US 11,967,172 B2
(45) Date of Patent: Apr. 23, 2024

(54) BIOMETRIC SENSOR DEVICE WITH IN-GLASS FINGERPRINT SENSOR

(71) Applicant: IMAGE MATCH DESIGN INC., Hsinchu County (TW)

(72) Inventors: Chia-Ming Wu, Hsinchu County (TW); Yan-Quan Pan, Hsinchu County (TW); Yen-Kuo Lo, Hsinchu County (TW); Yeh-Suan Yan, Hsinchu County (TW)

(73) Assignee: IMAGE MATCH DESIGN INC. (TW)

( * ) Notice: Subject to any disclaimer, the term of this patent is extended or adjusted under 35 U.S.C. 154(b) by 15 days.

(21) Appl. No.: 17/336,006

(22) Filed: Jun. 1, 2021

(65) Prior Publication Data
US 2022/0164564 A1 May 26, 2022

Related U.S. Application Data

(60) Provisional application No. 63/116,704, filed on Nov. 20, 2020.

(51) Int. Cl.
*G06V 40/13* (2022.01)
*G06F 21/32* (2013.01)
*G06V 40/10* (2022.01)
*G06V 40/12* (2022.01)

(52) U.S. Cl.
CPC ......... *G06V 40/1365* (2022.01); *G06V 40/10* (2022.01); *G06V 40/1318* (2022.01); *G06V 40/1329* (2022.01); *G06V 40/15* (2022.01)

(58) Field of Classification Search
CPC .......... G06V 40/1365; G06V 40/1318; G06V 40/1329; G06V 40/10; G06V 40/15
See application file for complete search history.

(56) References Cited

U.S. PATENT DOCUMENTS

| | | | |
|---|---|---|---|
| 8,917,387 B1 | 12/2014 | Lee et al. | |
| 2004/0222802 A1* | 11/2004 | Chou | G06V 40/1329 324/661 |
| 2005/0005703 A1 | 1/2005 | Saito et al. | |
| 2005/0110103 A1 | 5/2005 | Setlak | |
| 2012/0243084 A1* | 9/2012 | Koike | G02B 30/25 359/462 |

(Continued)

FOREIGN PATENT DOCUMENTS

| | | |
|---|---|---|
| CN | 107580709 A | 1/2018 |
| TW | 201546722 A | 12/2015 |

OTHER PUBLICATIONS

First non-Final Office Action dated May 31, 2022 issued by the Taiwan Intellectual Property Office for TW patent application 110128223.

(Continued)

*Primary Examiner* — Lixi C Simpson
(74) *Attorney, Agent, or Firm* — Dhiraj Jindal; PATENT YOGI LLC

(57) ABSTRACT

A device includes a touch-mode biometric sensor having a first side facing toward a user and a second side opposite to the first side, and a display arranged under the touch-mode biometric sensor and adjacent to the second side and configured to display an image in response to a sensing result, associated with a biometric feature of the user, of the touch-mode biometric sensor.

19 Claims, 6 Drawing Sheets

(56) References Cited

U.S. PATENT DOCUMENTS

| | | | | |
|---|---|---|---|---|
| 2014/0168152 A1* | 6/2014 | Ishizaki | ............... | G06F 3/0446 |
| | | | | 445/25 |
| 2016/0239701 A1* | 8/2016 | Lee | ................... | G06V 40/1347 |
| 2017/0032169 A1* | 2/2017 | Pi | ........................... | G06V 40/45 |
| 2017/0316249 A1* | 11/2017 | Lee | ................... | G06V 40/1365 |
| 2017/0351364 A1* | 12/2017 | Kim | ..................... | G06F 3/0443 |
| 2018/0268232 A1 | 9/2018 | Kim et al. | | |
| 2020/0006610 A1* | 1/2020 | Wang | ..................... | H01L 33/62 |
| 2020/0226347 A1* | 7/2020 | Kurasawa | ................ | G09F 9/00 |
| 2020/0307513 A1* | 10/2020 | Chung | .................. | B60R 25/25 |
| 2021/0097249 A1* | 4/2021 | Lee | ................... | H01L 27/0248 |

OTHER PUBLICATIONS

Second non-Final Office Action dated Jul. 29, 2022 issued by the Taiwan Intellectual Property Office for TW patent application 110128223.

U.S. Pat. No. 8,917,387 serving as English translation for TW 201546722A.

Abstract translation of first non-final Office Action dated May 31, 2022.

Abstract translation of second non-final Office Action dated Jul. 29, 2022.

First non-Final Office Action dated May 18, 2022 issued by the USPTO for U.S. Appl. No. 17/368,704.

First non-final Office Action dated Nov. 22, 2022 by Taiwan Intellectual Patent Office.

Office Action, Cited References and Search Report dated Mar. 28, 2023 issued by the Taiwan Intellectual Property Office for the Taiwan Counterpart Application No. 111133703.

Brief English translation of Office Action dated Mar. 28, 2023 issued by the Taiwan Intellectual Property Office for the Taiwan Counterpart Application No. 111133703.

US 20180046281 is the US counterpart of CN 107580709 A.

* cited by examiner

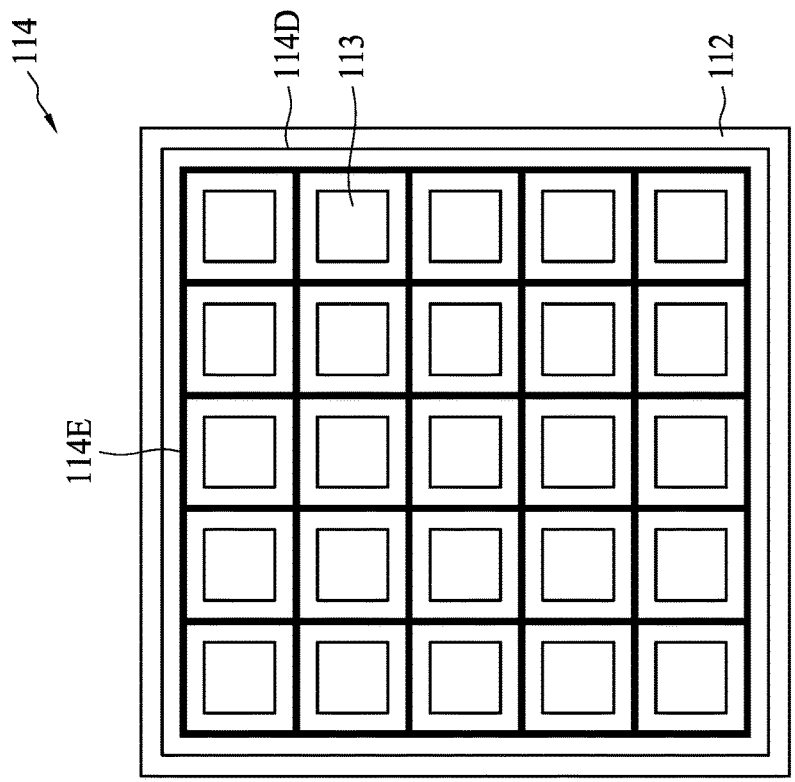
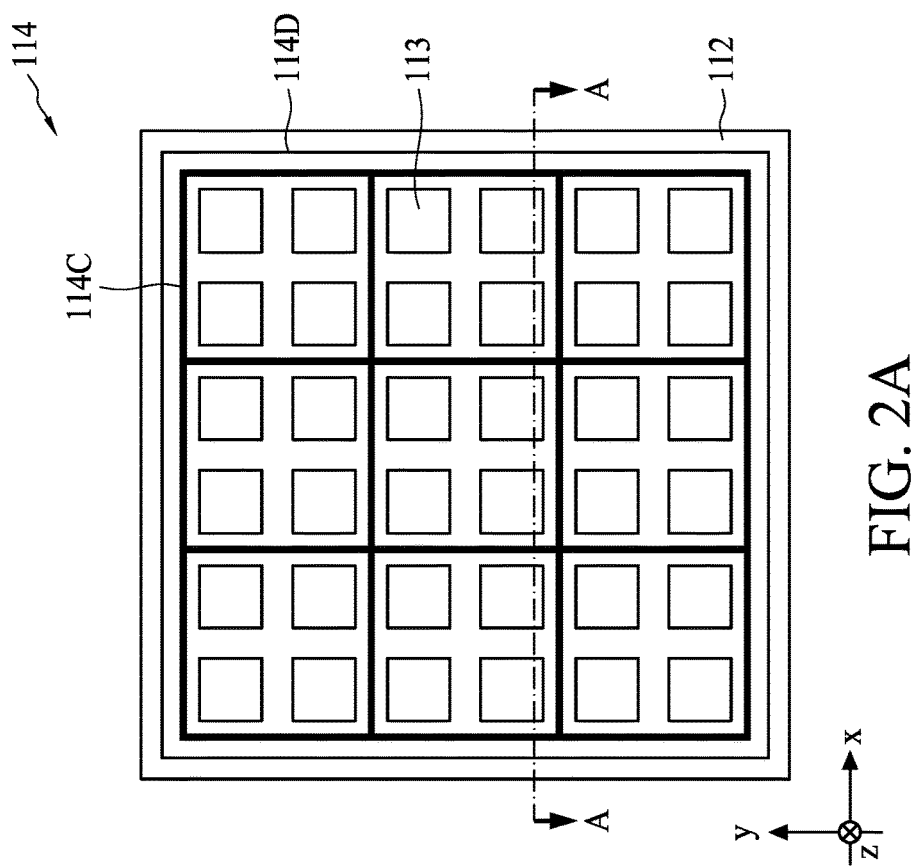
FIG. 2A
FIG. 2B

BIOMETRIC SENSOR DEVICE WITH IN-GLASS FINGERPRINT SENSOR

TECHNICAL FIELD

The present disclosure is generally related to a biometric sensor device and, more particularly, to a sensor device with an in-glass biometric fingerprint sensor.

BACKGROUND

Nowadays the convenience of mobile appliances like IC cards, smart phones and notebook computers brings us better life but also into privacy threat. The more widespread these mobile appliances are, the more significant the issue on personal security is. As a result, the demand for user authentication is becoming more and more important. Some biometric features, such as fingerprint, palm print, finger vein, iris and voiceprint, have been popularly applied in user authentication. Because of the property of low-cost, easy integration and high reliability, fingerprint sensors have been extensively developed. However, the integration of the existing fingerprint sensor with other device, such as a display module, still may not provide satisfactory performance. It may therefore be desirable to have a fingerprint sensor design that is able to be compatible with the display module while maintaining a compact size.

SUMMARY

Embodiments of the present invention provide a device. The device includes a touch-mode biometric sensor having a first side facing toward a user and a second side opposite to the first side, and a display arranged under the touch-mode biometric sensor and adjacent to the second side and configured to display an image in response to a sensing result, associated with a biometric feature of the user, of the touch-mode biometric sensor.

In some embodiments, the touch-mode biometric sensor is a fingerprint sensor.

In some embodiments, the touch-mode biometric sensor includes a substrate made of silicon oxide.

In some embodiments, the substrate is transparent to light emitted by the display.

In some embodiments, the device further includes a protective layer in a mesh pattern around the first side.

In some embodiments, the protective layer is electrically conductive.

In some embodiments, the touch-mode biometric sensor fully overlaps the display.

In some embodiments, the device further includes a cover plate arranged over the touch-mode biometric sensor and configured to contact a stimulus source during a touch event.

In some embodiments, the device further includes a circuit board laterally surrounding and electrically connected to the touch-mode biometric sensor.

In some embodiments, the device further includes a frame disposed on the circuit board and configured to conduct an electric current associated with the touch event to one or more fingers and/or a palm of the user.

Embodiments of the present invention discloses a device. The device includes a biometric sensor and a self-light emitting device disposed under the biometric sensor. The self-light emitting device is configured to be operated in associated with a biometric feature of a user, wherein light is generated by the light-emitting device toward the user through the biometric sensor.

In some embodiments, the biometric sensor is a touch-mode biometric sensor.

In some embodiments, the self-light emitting device is a pulse oximeter.

In some embodiments, the biometric sensor and the self-light emitting device are stacking along a first direction, wherein the device further comprises a conductive pillar extending along the first direction and electrically connected to the biometric sensor.

In some embodiments, the device further includes a first circuit board laterally surrounding and electrically connected to the biometric sensor, and a second circuit board is disposed under the self-light emitting device and electrically connected to the biometric sensor through the first circuit board, wherein the first circuit board and the second circuit board are secured by the conductive pillar.

In some embodiments, the second circuit board comprises an electronic device configured to transmit an electric signal to the user through the conductive pillar.

In some embodiments, the first circuit board comprises a conductive layer exposed to the user, wherein the electric signal is transmitted to the user through the conductive layer during a touch event.

In some embodiments, the device further includes a bus electrically coupling the biometric sensor to the second circuit board.

In some embodiments, the biometric sensor includes a transparent substrate and a plurality of sensing electrodes formed in an array on the transparent substrate.

In some embodiments, the device further includes an optically clear adhesive layer between the biometric sensor and the self-light emitting device.

The foregoing has outlined rather broadly the features and technical advantages of the present invention in order that the detailed description of the invention that follows may be better understood. Additional features and advantages of the invention will be described hereinafter. It should be appreciated by persons having ordinary skill in the art that the conception and specific embodiments disclosed may be readily utilized as a basis for modifying or designing other structures or processes for carrying out the same purposes of the present invention without departing from the spirit and scope of the invention as set forth in the appended claims.

BRIEF DESCRIPTION OF THE DRAWINGS

Details of one or more embodiments of the disclosure are set forth in the accompanying drawings and the description below. Other features and advantages of the disclosure will be apparent from the description, drawings and claims. Throughout the various views and illustrative embodiments, like reference numerals are used to designate like elements. Reference will now be made in detail to exemplary embodiments illustrated in the accompanying drawings.

FIGS. 2A and 2B are top views of a protective layer of the biometric sensor device shown in FIG. 1A, in accordance with various embodiments of the present invention.

DETAIL DESCRIPTION

In order to make the disclosure comprehensible, detailed steps and structures are provided in the following description. Obviously, implementation of the disclosure does not limit special details known by persons skilled in the art. In addition, known structures and steps are not described in detail, so as not to limit the disclosure unnecessarily. Preferred embodiments of the disclosure will be described below in detail. However, in addition to the detailed description, the disclosure may also be widely implemented in other embodiments. The scope of the disclosure is not limited to the detailed description, and is defined by the claims.

Further, it will be understood that when an element is referred to as being "connected to" or "coupled to" or "coupled with" another element, it may be directly connected to or coupled to the other element, or intervening elements may be present.

Figure 1A:
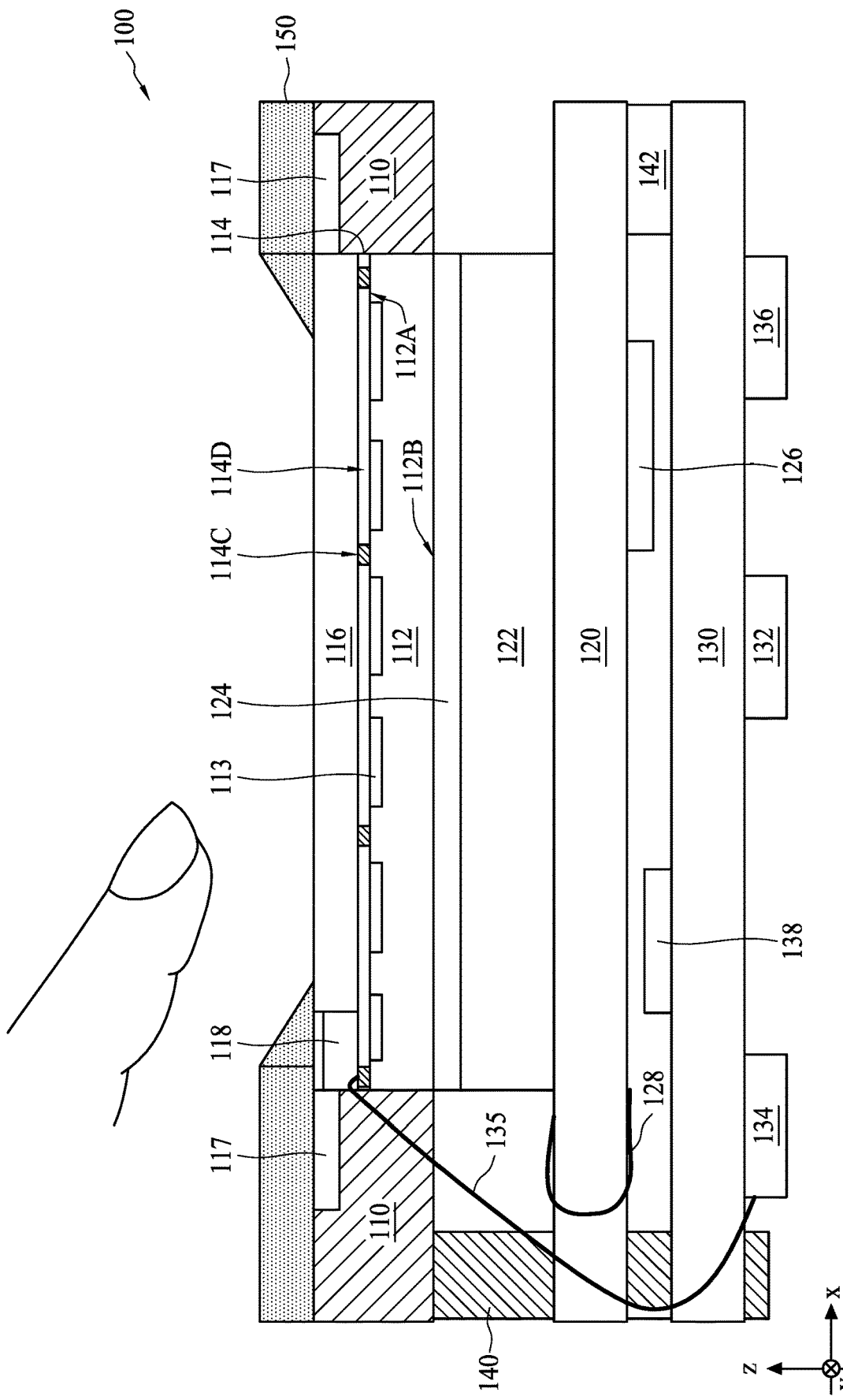
FIG. 1A is a cross-sectional view of a biometric sensor device, in accordance with some embodiments of the present invention.

FIG. 1A is a cross-sectional view of a biometric sensor device 100, in accordance with some embodiments of the present invention. In some embodiments, the biometric sensor device 100 is configured to sense biometric data and authenticate the user through the biometric data. The biometric sensor device 100 may be adapted to work with an electronic device (not shown), such as a smart phone, a personal computer and a personal digital assistant. Alternatively, the biometric sensor device 100 is adapted to work with a personal item protected by a tangible key or a password, such as a door lock, a combination lock, an identity card, a safe or the like, such that the biometric sensor device 100 can be used to protect personal information of the user in place of the key or password. In the present embodiment, the biometric sensor device 100 includes a fingerprint or palm print sensor and the biometric feature is the user's fingerprint and/or palm print patterns. The biometric sensor device 100 may be configured as a touch-mode sensor device, in which a stimulus source, e.g., the fingerprint, may be received by the sensing elements during a touch event of the biometric sensor device 100.

Referring to FIG. 1A, the biometric sensor device 100 includes a first circuit board 110, a second circuit board 120, a third circuit board 130, a conductive pillar 140 and a frame 150. The biometric sensor device 100 further includes a biometric sensor 112, a protective layer 114, a cover plate 116, a display 122, and an adhesive layer 124.

In the present embodiment, the display 122 is a self-light emitting display. The display 122 is arranged over and electrically connected to the second circuit board 120. The display 122 may be formed of an organic light emitting diode (OLED) panel or other suitable self-luminous display. As an exemplary OLED display panel, the display 122 may include, but not limited to, a substrate, an anode layer, a hole transport layer, a light emitting layer, an electron transport layer, and a cathode layer arranged in a stack for emitting light in response to biasing voltages on the anode layer and the cathode layer. The light of the display 122 may transmit toward the user above the cover plate 116 through the adhesive layer 124, the biometric sensor 112, the protective layer 114 and the cover plate 116.

The biometric sensor 112 is formed over the display 122. The biometric sensor 112 may include a fingerprint sensor configured to capture or sense fingerprint or palm print data of a user's hand. In some embodiments, the biometric sensor 112 includes a first side 112A facing toward a finger or a palm of the user and a second side 112B opposite to the first side 112A. The biometric sensor 112 includes a substrate made of a transparent material to the light emitted by the display 122 such that the image of the display 122 is visible through the biometric sensor 112. The substrate of the biometric sensor 112 is formed of silicon oxide and may be in the form of glass or quartz, and thus the biometric sensor 112 is referred to herein as "in-glass fingerprint sensor."

The biometric sensor 112 includes one or more sensing electrodes 113 on the top surface of the substrate of the biometric sensor 112. The sensing electrodes 113 may include a plurality of sensing electrodes. In some embodiments, the sensing electrodes 113 include transparent conductive materials, such as indium tungsten oxide (ITO), fluorine doped tin oxide (FTO) or doped zinc oxide. In some embodiments, the biometric sensor 112 further include a sensing circuitry (not shown) connected to the sensing electrodes 113. The sensing circuitry may include one or more transistors configured to provide a sensing voltage according to the sensing capacitance or sensing voltage according to the sensing electrodes. In some embodiments, the sensing voltage is transmitted to the third circuit board 130 for further processing.

In some embodiments, the adhesive layer 124 is used to adhere the biometric sensor 112 to the display 122. The adhesive layer 124 may include an optically clear adhesive (OCA), such as LOCA (liquid optically clear adhesive).

The cover plate 116 is arranged over the biometric sensor 112. In some embodiments, the cover plate 116 is transparent to a radiation spectrum of the display 122 such that the image of the display 122 is visible to the user through the cover plate 116. The cover plate 116 is made of glass or other suitable transparent materials.

In some embodiments, the protective layer 114 is formed between the biometric sensor 112 and the cover plate 116 and configured to protect the biometric sensor 112 or other features of the biometric sensor device 100 from damage by an electrostatic discharge (ESD) effect. In some embodiments, the protective layer 114 is arranged over the first side 112A of the biometric sensor 112. FIG. 2A shows a top view of the protective layer 114 overlaid with the biometric sensor 112, in which the cross-sectional view of FIG. 1A is taken from the sectional line AA of FIG. 2A. Referring to FIG. 1A and FIG. 2A, the biometric sensor 112 includes a plurality of sensing electrodes 113 configured to detect a coupled capacitance with the user's finger. In some embodiments, the sensing electrodes 113 are arranged in a grid or array. In some embodiments, the sensing electrodes 113 are classified into drive electrodes for providing driving signals and receive electrodes for receiving sensing signals. The drive electrodes may be alternatively arranged with the receive electrodes.

In some embodiments, the protective layer 114 includes a conductive layer 114C and an insulating layer 114D surrounding the conductive layer 114C. In some embodiments, the conductive layer 114C is formed of conductive materials, such as copper, tungsten, aluminum, or other suitable conductive materials. The insulating layer 114D is used for electrically insulate the conductive layer 114C from other conductive features of the biometric sensor device 100. The insulating layer 114D may be formed of a dielectric material, such as silicon oxide, silicon nitride, resin, epoxy, polymer, or other suitable materials.

The conductive layer 114C is formed over the array of the sensing electrodes 113 and configured to protect the sensing electrodes 113 from the ESD damage. In the present embodiment, the mesh pattern of the conductive layer 114C partitions the electrodes of the sensing electrodes 113 into electrode groups each including four electrodes from a top-view perspective. However, the present disclosure is not limited thereto. The mesh pattern of the conductive layer 114C may be configured otherwise to partition the sensing electrodes 113 into electrode groups of various electrode numbers. In some embodiments, the protective layer 114 has a thickness in the z-direction in a range between about 1 μm and about 3 μm, such as 2 μm. In some embodiments, the first circuit board 110 has a thickness substantially equal to a thickness sum of the biometric sensor 112, the protective layer 114 and the cover plate 116. In some embodiments, the first circuit board 110 has a thickness substantially equal to a thickness sum of the biometric sensor 112, the protective layer 114, the cover plate 116 and the adhesive layer 124.

FIG. 2B is a top view of the protective layer 114 overlaid with the biometric sensor 112, in accordance with another embodiment. In the embodiment shown in FIG. 2B, the protective layer 114 includes a conductive layer 114E and an insulating layer 114D. The conductive layer 114E is similar to the conductive layer 114C in many aspects, except that the conductive layer 114E forms a mesh pattern which partitions the array of sensing electrodes 113 into individual electrodes. In some embodiments, each of the sensing electrodes 113 is laterally surrounded by the mesh pattern of the conductive layer 114E from a top-view perspective.

Referring to FIG. 1A, the first circuit board 110, the second circuit board 120 and the third circuit board 130 are arranged in parallel along the xy-plane over one another. A stack formed of the cover plate 116, the protective layer 114, the biometric sensor 112, the adhesive layer 124 and the display 122 is formed over the second circuit board 120 and extends through the first circuit board 110. The first circuit board 110, the second circuit board 120 and the third circuit board 130 are connected by the conductive pillar 140. The conductive pillar 140 may be formed of a screw, a bolt, a nail, or other conductive members, and may run in the z-direction perpendicular to the xy-plane through the first circuit board 110, the second circuit board 120 and the third circuit board 130. In some embodiments, the circuit board 110, 120 or 130 has a thickness in the z-direction in a range between about 600 μm and about 1000 μm, such as 700 μm. In some embodiments, each of the circuit boards 110, 120 and 130 include insulating materials, e.g., a solder mask, configured to electrically insulate the conductive pillar 140 from the conductive features of the circuit boards 110, 120 and 130. The conductive pillar 140 may serve the function of securing the circuit boards 110, 120 and 130. Further, the conductive pillar 140 is configured to provide electric signals, e.g., a sensing clock signal, between the circuit boards 110 and 130. The electric signals may be transmitted to the user's finger and aid in establishing an electric field between the user's finger and the sensing electrodes 113 to thereby generate a coupled capacitance in the presence of the user's finger.

The frame 150 is arranged over the first circuit board 110 and adjacent to the cover plate 116. In some embodiments, the frame 150 include a cover portion exposing the cover plate 116. The frame 150 may be formed of a rigid material for providing mechanical support of the first circuit board 110. A molding material 118 is provided between the cover plate 116 and the frame 150 to encapsulate the cover plate 116. The molding material 118 may be formed of resin, epoxy, and the like. In some embodiments, the frame 150 is formed of conductive materials and configured to receive electric signals, in response to a touch event, to the circuit boards 110, 120 or 130. Although not separately shown, the frame 150 may include a bevel portion surrounding sidewalls of the cover plate 116, the protective layer 114 and the biometric sensor 112.

In some embodiments, the frame 150 includes a conductive material, e.g., formed of a metallic material, and electrically coupled to the conductive pillar 140. The frame 150 faces the user's finger and conducts electric current through the conductive pillar 140. During operation, when the user's finger touches the cover plate 116, the user's finger will also touches the conductive frame 150. In this way, the finger will conduct current by help of the frame 150 to facilitate the sensing process of the fingerprint. In some embodiments, the first circuit board 110 includes a conductive layer exposed from the upper surface of the first circuit board 110. The conductive layer of the first circuit board 110 may face the frame 150 and the finger of the user, in which the conductive layer is configured to convey electric signals to the user's finger from the conductive pillar 140 during a touch event. In some other embodiments, the frame 150 is formed of non-conductive materials, such as glass, plastics, ceramic, or the like.

The first circuit board 110 is configured to support the frame 150. In some embodiments, the first circuit board 110 is configured to secure and electrically connect to the biometric sensor 112. The first circuit board 110 may be a printed circuit board (PCB), a metal core PCB (MCPCB) or a flexible PCB (FPCB). The first circuit board 110 may include an opening defined by a peripheral region, in which the biometric sensor 112 is embedded in the opening and laterally surrounded by the peripheral region of the first circuit board 110. In some embodiments, although not explicitly shown, the first circuit board 110 includes a bus, e.g., formed of conductive wirings or vias, electrically connected to the biometric sensor 112.

In some embodiments, the first circuit board 110 includes a conductive layer 117 formed on the upper surface of the first circuit board 110 and laterally surrounding the cover plate 116. The conductive layer 117 may be electrically coupled to the frame 150 and configured to transmit electric signals, in response to a touch event, to the second circuit board 120 or the third circuit board 130 through the frame 150.

The second circuit board 120 includes an upper surface on which the display 122 is disposed. In some embodiments, the second circuit board 120 is configured to electrically connect the display 122 with external devices. The second circuit board 120 may be a PCB, a MCPCB or a FPCB. In some embodiments, the second circuit board 120 includes an electronic device 126 disposed on a lower surface thereof opposite to the upper surface of the second circuit board 120. The electronic device 126 may be a display driver device configured to control display functions of the display 122. In some embodiments, the second circuit board 120 includes a bus 128 to electrically connect the display 122 with the electronic device 126. The bus 128 may a bus formed as a flexible printed circuit (FPC), or including bonding wires or conductive vias extending through the second circuit board 120.

The third circuit board 130 is configured to electrically connect the first circuit board 110 and the second circuit board 120 to external devices. The third circuit board 130 may be a PCB, a MCPCB or a FPCB. The third circuit board 130 includes an electronic device 132, a connector 134 and a connection port 136 disposed on a lower surface. The third circuit board 130 also includes and an electronic device 138 and a connector 142 disposed on an upper surface opposite to the lower surface of the third circuit board 130.

The electronic device 132 may be a processor, a microcontroller, a signal processing unit, or the like configured to control the sensing functions of the biometric sensor 112 and the display functions of the display 122. The third circuit board 130 is electrically connected to the biometric sensor 112 through a bus 135, e.g., an FPC, a bonding wire, or the connector 134 on the third circuit board 130. The connector 134 may be a socket or solder pads to be electrically coupled to the bus 135. The connector 134 may be a serial connector or a parallel connector. In some embodiments, the connection port 136 is a universal serial bus (USB) port for electrically connect the third circuit board 130 with devices external to the biometric sensor device 100.

In some embodiments, the electronic device 138 is a sensor driver device configured to enable the sensing functions of the biometric sensor 112. In some embodiments, the electronic device 132 is configured to control the biometric sensor 112 and the display 122 through the electronic devices 138 and 126, respectively. The electronic device 138 may be electrically connected to the biometric sensor 112 through the bus 135 and the connector 134, and optionally through conductive vias of the third circuit board 130. In some embodiments, the electronic device 138 is configured to generate the sensing clock signals and transmit the sensing clock signals to the user's finger through the first circuit board 110 or the frame 150.

The connector 142 may electrically connect the third circuit board 130 to the second circuit board 120. In some embodiments, the connector 142 includes a bus, e.g., an FPC or a bonding wire, and a socket for electrically coupling the second circuit board 120 to the third circuit board 130 to thereby provide power or signals between the circuit boards 120 and 130. The connector 142 may be a serial connector or a parallel connector.

During a touch event, the biometric sensor 112 is configured to sense the presence of the user's finger. The biometric sensor 112 and the electronic device 132 are configured to authenticate the user through recognizing the fingerprint pattern of the user. In some embodiments, the display 122 is configured to generate an image which contains instructions or recognition results that can be shown to the user through the in-glass biometric sensor 112. In some embodiments, the display 122 is configured to show the image to the user in response to a sensing result, associated with a biometric feature of the user, of the biometric sensor 112. In some embodiments, the display 122 is configured to display the image associated with the sensing result provided by the biometric sensor 112 before, during, or after the fingerprint recognition process is performed. Since the substrate and the sensing electrodes 113 of the biometric sensor 112 are made of transparent materials, the image of the display 122 can be readily visible to the user during the touch event. No extra areas are required for the individual biometric sensor 112 and the display 122. Therefore, the biometric sensor device 100 is capable of providing both the display and fingerprint recognition functions with a minimized device size.

Figure 1B:
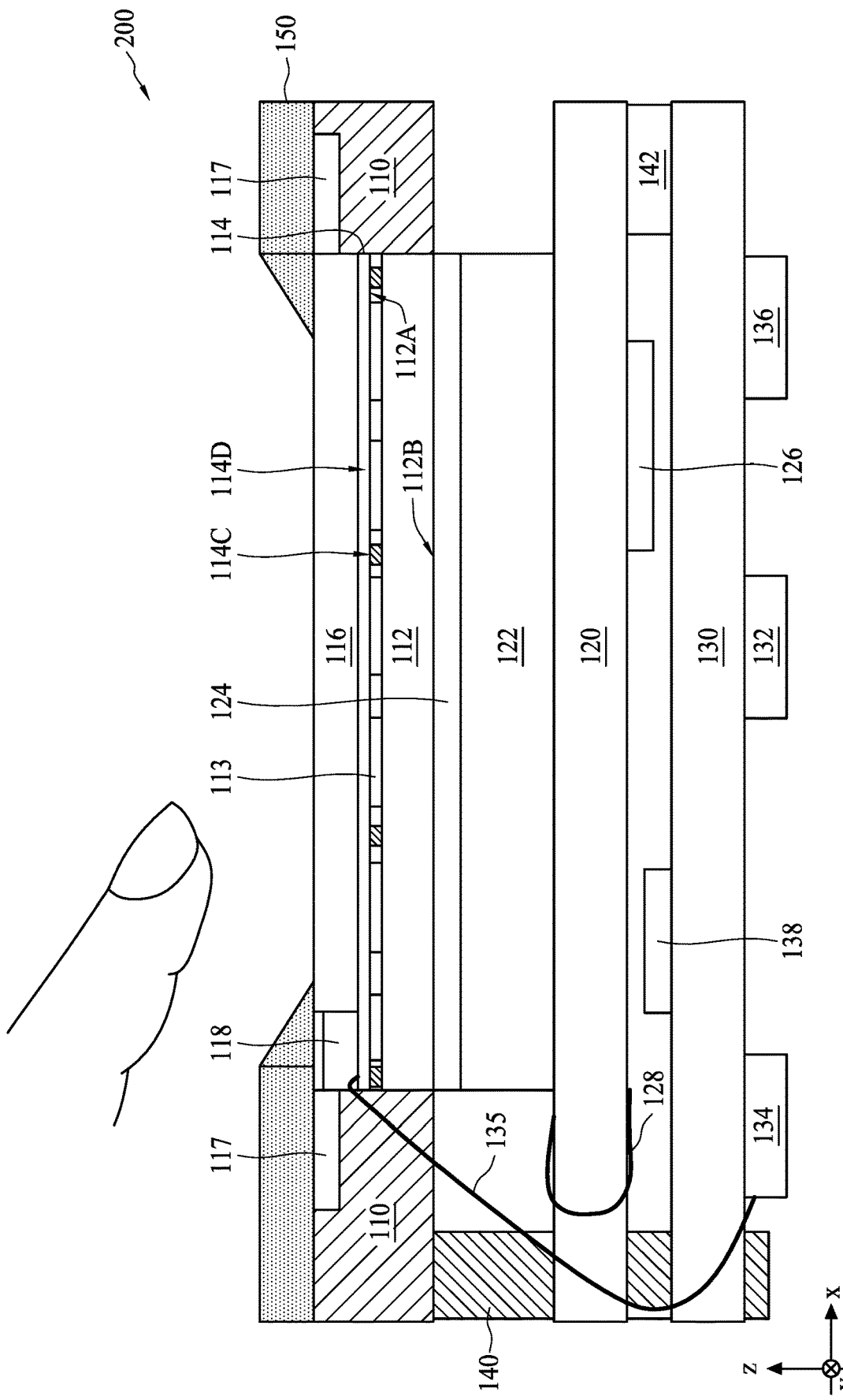
FIG. 1B is a cross-sectional view of a biometric sensor device, in accordance with some embodiments of the present invention.

FIG. 1B is across-sectional view of a biometric sensor device 200, in accordance with some embodiments of the present invention. In some embodiments, the biometric sensor device 200 is similar to the biometric sensor device 100 in many aspects, and thus descriptions of these similar features are not repeated for brevity. The biometric sensor device 200 is different from the biometric sensor device 100 in that the conductive layer 114C, which laterally surrounds the sensing electrodes 113, is arranged in the same level of the sensing electrodes 113. In such arrangement, the conductive layer 114C is arranged on the first side 112A of the biometric sensor 112. In some embodiments, the sensing electrodes 113 are insulated from the conductive layer 114C by an insulating material. The insulating material may include a material similar to the tha of the insulating layer 114D. The insulating layer is arranged over the sensing electrodes 113 and the conductive layer 114C.

Figure 3B:
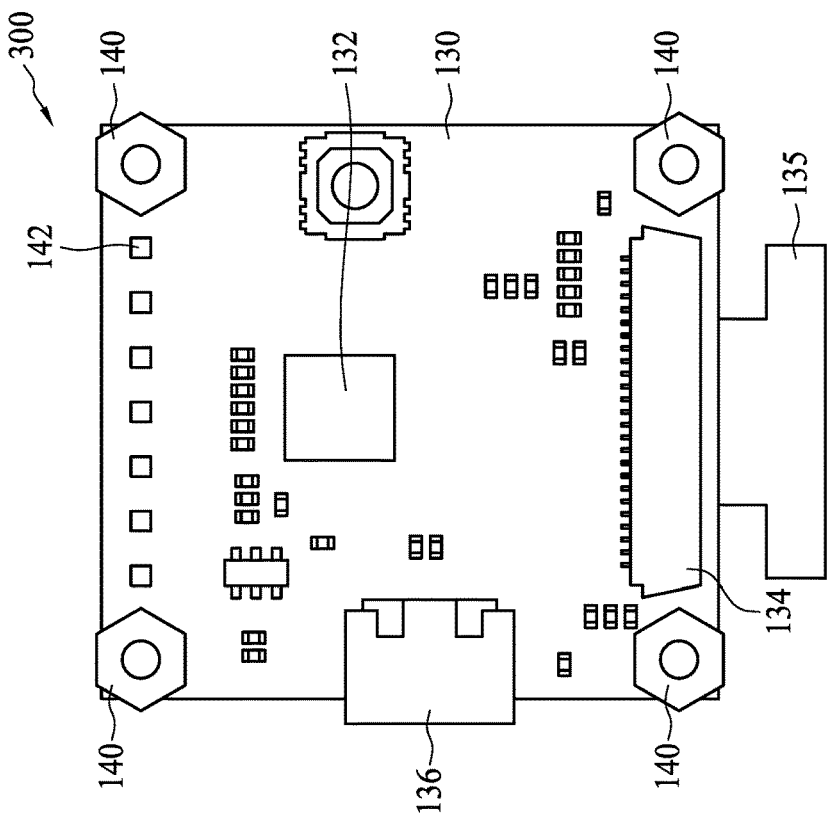
FIGS. 3A and 3B are a schematic top view and a schematic bottom view, respectively, of a biometric sensor device, in accordance with various embodiments of the present invention.
Figure 3A:
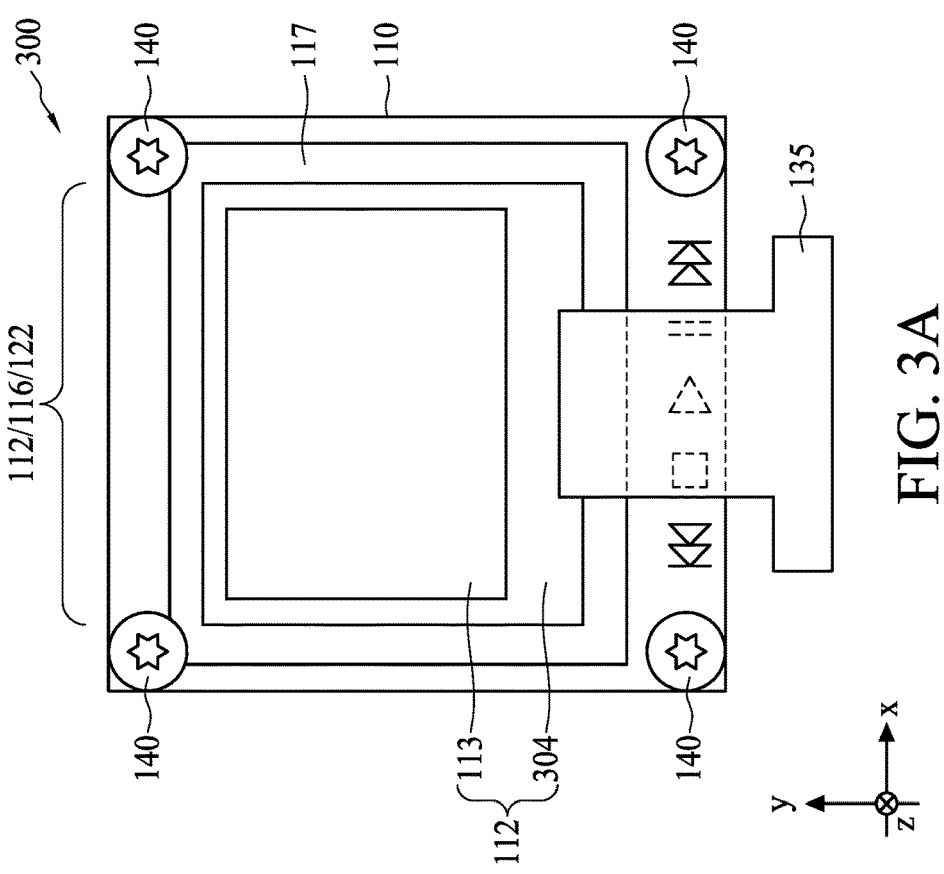
Figure 3D:
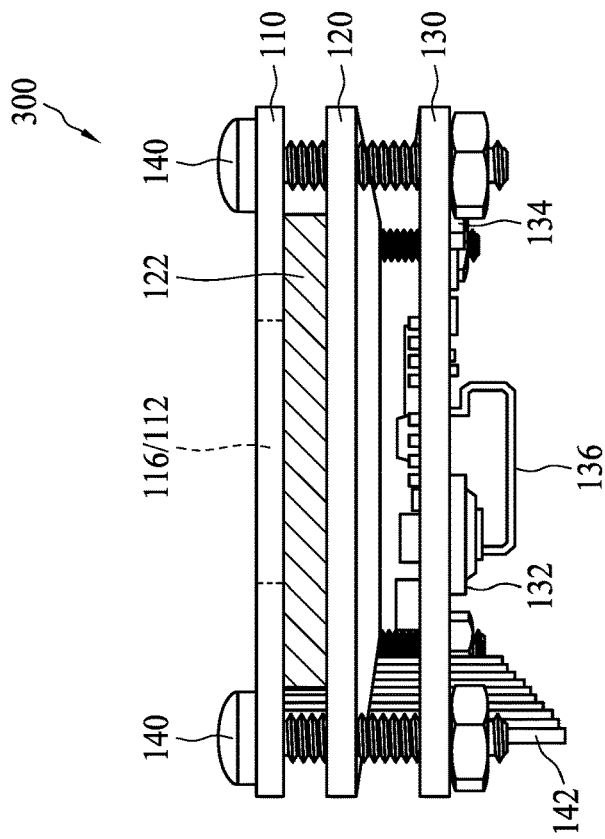
FIGS. 3C and 3D are a schematic left side view and a schematic right side view, respectively, of a biometric sensor device shown in FIG. 3A, in accordance with various embodiments of the present invention.
Figure 3C:
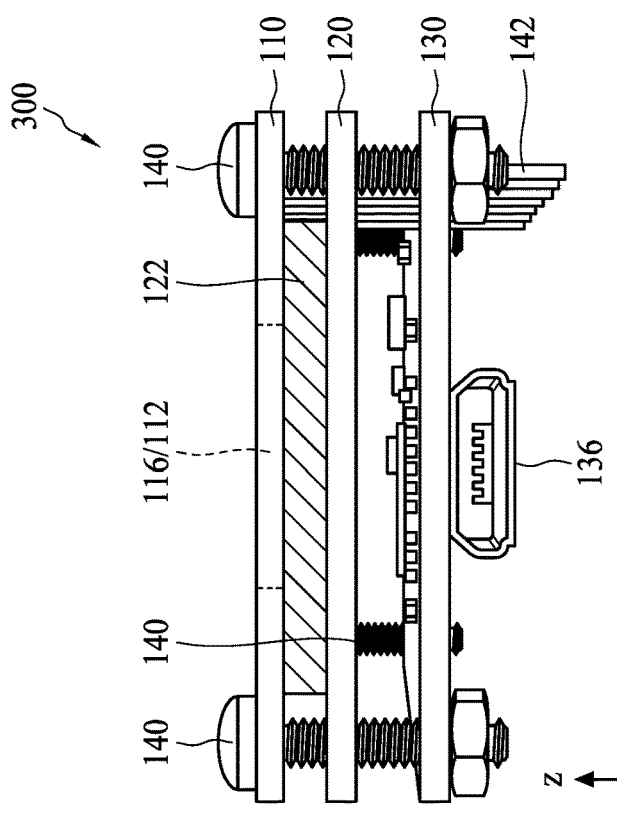

FIGS. 3A and 3B are a schematic top view and a schematic bottom view, respectively, of a biometric sensor device 300, in accordance with various embodiments of the present invention. FIGS. 3C and 3D are a schematic left side view and a schematic right side view, respectively, of the biometric sensor device 300 shown in FIG. 3A, in accordance with various embodiments of the present invention. The biometric sensor device 300 is similar to the biometric sensor device 100 in many features, and thus descriptions of these features are omitted for brevity. Referring to FIG. 3A, the top view of the biometric sensor device 300 includes the cover plate 116, the biometric sensor 112 and the display 122 stacked in the z-direction, in which the screen of the display 122 is visible through the biometric sensor 112 and the cover plate 116. The biometric sensor 112 includes a sensing circuit 304 and the sensing electrodes 113. In some embodiments, the sensing circuit 304 may be non-transparent to the light emitted by the display 122. In some embodiments, the sensing circuit 304 is formed of semiconductor materials, such as silicon, germanium, or the like. In some embodiments, the biometric sensor 112 fully overlaps the display 122 from a top-view perspective. In some embodiments, the sensing electrodes 113 of the biometric sensor 112 occupy an area substantially equal to the area of the display 122. In some embodiments, the biometric sensor 112 has an area greater than the area of the display 122 due to the sensing circuit 304.

In some embodiments, referring to FIGS. 3A, 3C and 3D, the first circuit board 110 laterally surrounds the cover plate 116 and the biometric sensor 112. In some embodiments, the first circuit board 110 includes the conductive layer 117 formed on the upper surface of the first circuit board 110 and laterally surrounding the cover plate 116. The conductive layer 117 may be in a circular shape or a ring shape, and is substantially level with the cover plate 116 or arranged facing the finger of the user. In some embodiments, the bus 135 is electrically coupled to the first circuit board 110 or the sensing circuit 304 of the biometric sensor 112.

Figure 4:
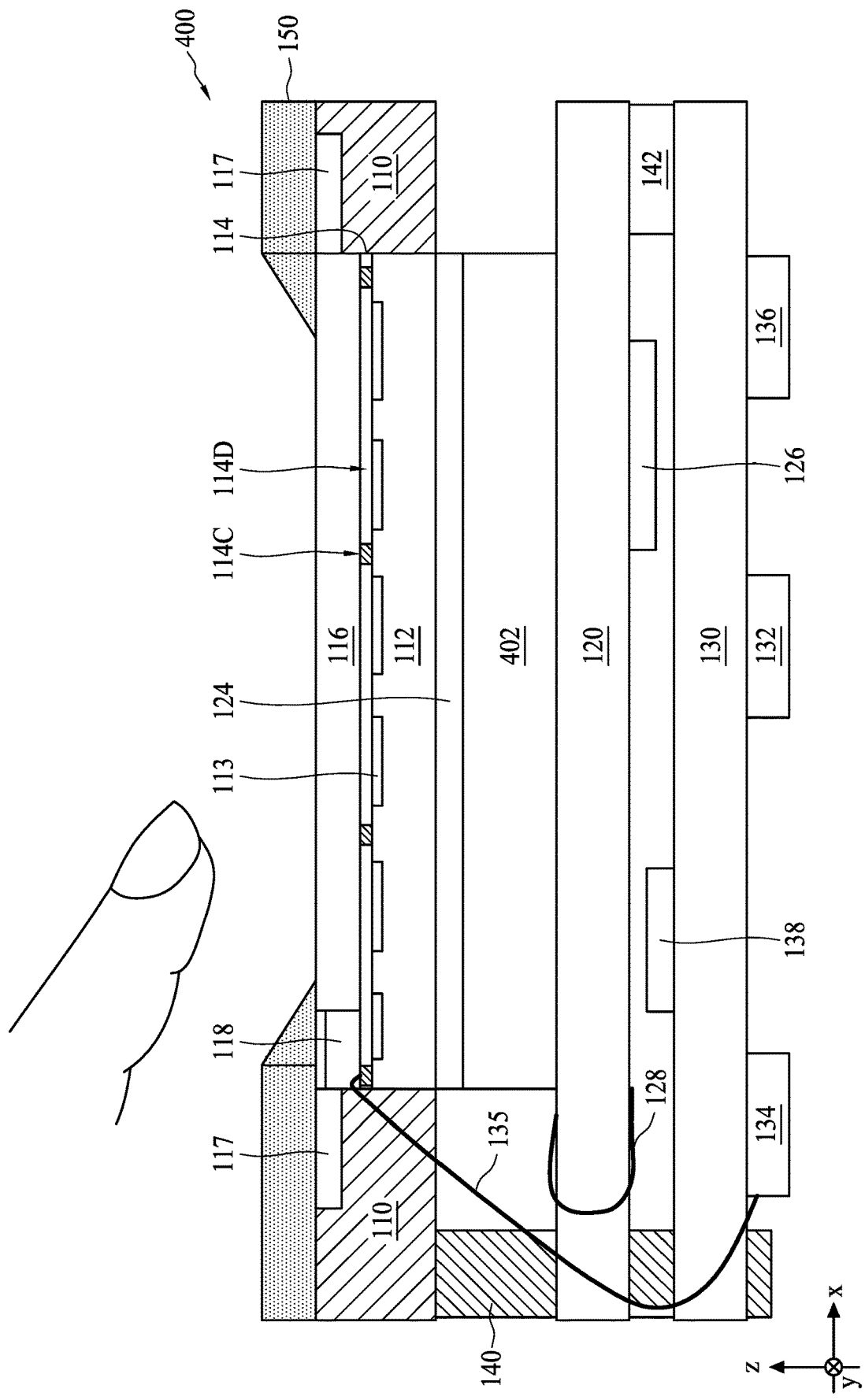
FIG. 4 is a cross-sectional view of a biometric sensor device, in accordance with an embodiment of the present invention.

FIG. 4 is a cross-sectional view of a biometric sensor device 400, in accordance with an embodiment of the present invention. The biometric sensor device 400 is similar to the biometric sensor device 100 in many features, and thus descriptions of these features are omitted for brevity. The biometric sensor device 400 differs from the biometric sensor device 100 in that the biometric sensor device 400 alternatively or additionally includes a pulse oximeter, or simply oximeter, 402 serving as a self-light emitting device and arranged on the second circuit board 120. In some embodiments, the pulse oximeter 402 is configured to measure the oxygen level in the user's blood in a non-invasive manner through transmission of sensing light to the user's finger through the biometric sensor 112 and the cover plate 116. In some embodiments, the sensing light of the pulse oximeter 402 is in a range of red light and infrared light. In a touch event, the biometric sensor device 400 is capable of performing user authentication and blood oxygen level at the same time. In addition, due to the transparent substrate and the transparent sensing electrode 113 of the biometric sensor 112, the sensing light of the pulse oximeter 402 can be readily transmitted to the user and reflected to the pulse oximeter 402 during the touch event. No extra areas are required for the individual biometric sensor 112 and the pulse oximeter 402. Therefore, the biometric sensor device 400 is capable of providing both the blood oxygen level measurement and fingerprint recognition functions with a minimized device size.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A device, comprising:
a touch-mode biometric sensor having a first side facing toward a user and a second side opposite to the first side;
a display arranged under the touch-mode biometric sensor, adjacent to the second side and configured to display an image in response to a sensing result, associated with a biometric feature of the user, of the touch-mode biometric sensor;
a frame disposed over the display and configured to conduct an electric current associated with a touch event to a finger of the user, wherein the frame comprises a bevel portion that overlaps a periphery of the display from a top-view perspective;
a first circuit board laterally surrounding the touch-mode biometric sensor, wherein the first circuit board comprises a sidewall and an upper surface adjacent to the sidewall, the sidewall of the first circuit board is in contact with the touch-mode biometric sensor, and the upper surface of the first circuit board is in contact with the frame;
a second circuit board supporting the display;
a third circuit board arranged under the second circuit board; and
a conductive pillar penetrating the first circuit board, the second circuit board, and the third circuit board to secure the first circuit board, the second circuit board, and the third circuit board, wherein the conductive pillar is configured to transmit an electrical signal from the third circuit board to the frame through the first circuit board,
wherein the image associated with the sensing result is overlapped with the finger during the touch event from the top-view perspective, and the touch event is configured to authenticate the user through recognizing a biometric pattern of the user.

2. The device of claim 1, wherein the touch-mode biometric sensor is a fingerprint sensor.

3. The device of claim 1, wherein the touch-mode biometric sensor includes a substrate made of silicon oxide.

4. The device of claim 3, wherein the substrate is transparent to light emitted by the display.

5. The device of claim 1, further comprising a protective layer in a mesh pattern around the first side, wherein the bevel portion of the frame is overlapped with the protective layer from a cross-sectional view.

6. The device of claim 5, wherein the protective layer is electrically conductive.

7. The device of claim 1, wherein the touch-mode biometric sensor fully overlaps the display.

8. The device of claim 1, further comprising a cover plate arranged over the touch-mode biometric sensor and configured to contact a stimulus source during the touch event.

9. The device of claim 8, wherein the first circuit board is electrically connected to the touch-mode biometric sensor.

10. The device of claim 9, wherein the frame is disposed on the first circuit board and configured to conduct an electric current associated with the touch event through the first circuit board, wherein the touch-mode biometric sensor is spaced apart from an entirety of the frame by the first circuit board.

11. A device, comprising:
a biometric sensor;
a self-light emitting device disposed under the biometric sensor and configured to display an image in response to a sensing result, associated with a biometric feature of a user, of the biometric sensor, wherein light is generated by the self-light emitting device toward the user through the biometric sensor;
a frame disposed over the display and configured to conduct an electric current associated with a touch event to a finger of the user, wherein the frame comprises a bevel portion that overlaps a periphery of the self-light emitting device from a top-view perspective,
a first circuit board laterally surrounding the biometric sensor, wherein the first circuit board comprises a sidewall and an upper surface adjacent to the sidewall, the sidewall of the first circuit board is in contact with the biometric sensor and the upper surface of the first circuit board is in contact with the frame;
a second circuit board supporting the self-light emitting device;
a third circuit board arranged under the second circuit board; and
a conductive pillar penetrating the first circuit board, the second circuit board, and the third circuit board to secure the first circuit board, the second circuit board, and the third circuit board, wherein the conductive pillar is configured to transmit a first electrical signal from the third circuit board to the frame through the first circuit board,
wherein the image associated with the sensing result is overlapped with the finger during the touch event from the top-view perspective, and the touch event is configured to authenticate the user through recognizing a biometric pattern of the user.

12. The device of claim 11, wherein the biometric sensor is a touch-mode biometric sensor.

13. The device of claim 11, wherein the biometric sensor and the self-light emitting device are stacking along a first direction, and the conductive pillar extends along the first direction and electrically connected to the biometric sensor.

14. The device of claim 13, wherein:
the first circuit board is electrically connected to the biometric sensor, and the biometric sensor is spaced apart from an entirety of the frame by the first circuit board; and
the second circuit board is electrically connected to the biometric sensor through the first circuit board.

15. The device of claim 14, wherein the second circuit board is electrically insulated from the conductive pillar.

16. The device of claim 15, wherein the first circuit board comprises a conductive layer exposed to the user, wherein the electric signal is transmitted to the user through the conductive layer during the touch event.

17. The device of claim 14, further comprising a bus electrically coupling the biometric sensor to the second circuit board.

18. The device of claim 11, wherein the biometric sensor comprises a transparent substrate and a plurality of sensing electrodes formed in an array on the transparent substrate.

19. The device of claim 11, further comprising an optically clear adhesive layer between the biometric sensor and the self-light emitting device.

* * * * *